United States Patent
Hou et al.

(10) Patent No.: US 8,006,012 B2
(45) Date of Patent: Aug. 23, 2011

(54) DATA STORAGE SYSTEM

(75) Inventors: Kun-Hong Hou, Taipei County (TW); Hsiao-Ying Chen, Hsinchu County (TW)

(73) Assignee: Princeton Technology Corporation, Taipei County (TW)

( * ) Notice: Subject to any disclaimer, the term of this patent is extended or adjusted under 35 U.S.C. 154(b) by 810 days.

(21) Appl. No.: 12/068,318

(22) Filed: Feb. 5, 2008

(65) Prior Publication Data
US 2008/0320239 A1 Dec. 25, 2008

(30) Foreign Application Priority Data
Jun. 23, 2007 (TW) .............................. 96122711 A

(51) Int. Cl.
*G06F 13/00* (2006.01)
(52) U.S. Cl. .................. 710/110; 711/148; 711/150
(58) Field of Classification Search .............. 710/110; 711/117–119, 126, 127, 148, 150, 161, 162
See application file for complete search history.

(56) References Cited

U.S. PATENT DOCUMENTS

| | | | | |
|---|---|---|---|---|
| 6,081,860 A * | 6/2000 | Bridges et al. | ................. | 710/110 |
| 6,850,998 B2 * | 2/2005 | Inoue et al. | .................... | 710/38 |
| 7,493,433 B2 * | 2/2009 | Behrendt et al. | .............. | 710/110 |
| 7,626,861 B1 * | 12/2009 | Lakkapragada et al. | . | 365/185.08 |
| 7,809,873 B2 * | 10/2010 | Perry et al. | .................... | 710/110 |
| 2002/0087805 A1 * | 7/2002 | Lee | ............................... | 711/141 |
| 2003/0191809 A1 * | 10/2003 | Mosley et al. | ................. | 709/213 |
| 2006/0004912 A1 * | 1/2006 | Najam et al. | ................... | 709/213 |
| 2006/0095670 A1 * | 5/2006 | Behrendt et al. | .............. | 711/118 |
| 2007/0276977 A1 * | 11/2007 | Coteus et al. | ................. | 710/305 |
| 2008/0072116 A1 * | 3/2008 | Brittain et al. | ................. | 714/758 |

* cited by examiner

*Primary Examiner* — Glenn A Auve

(74) *Attorney, Agent, or Firm* — Muncy, Geissler, Olds & Lowe, PLLC

(57) ABSTRACT

A data storage system is provided. The data storage system includes a first storage module for storing a first data, a second storage module for storing a second data, a control module and a processing module. The control module generates a first control signal and a second control signal, and accesses the first data and the second data according to the first control signal and the second control signal. The processing module is coupled to the first storage module, the second storage module and the control module, and controls the first storage module and the second storage module to transmit the first data and the second data to the control module according to the first control signal and the second control signal respectively, wherein the processing module bypasses the second storage module when receiving the first control signal.

16 Claims, 4 Drawing Sheets

DATA STORAGE SYSTEM

BACKGROUND OF THE INVENTION

1. Field of the Invention

The invention relates to a data storage system, and more particularly to a data storage system with an Inter Integrated circuit ($I^2C$) interface.

2. Description of the Related Art

The inter Integrated circuit ($I^2C$) interface is a two-lined serial bus interface invented by Philips Company. The $I^2C$ bus is a bidirectional, two-lined, serial and multi-master interface standard and has a bus arbitration scheme, wherein the $I^2C$ bus is suitable for small distances and occasional data communication between devices. The $I^2C$ interface has a perfect protocol to reliably provide transmitting and receiving of data. One apparatus used is a host apparatus for controlling bus transmission and generating a clock signal and another apparatus used is a slave apparatus for transmitting data. The host apparatus may also read data from the slave apparatus except when transmitting data to the slave apparatus. Therefore, the $I^2C$ is generally used in various applications due to usage of two simple hardware interface lines.

Referring to FIG. 1, FIG. 1 shows an RF tuner system applied with the $I^2C$. As shown in FIG. 1, a master interface 101 of a host controller 10 controls a first slave interface 121 located at a base band processor 12 and a second slave interface 141 located at an RF tuner 14 to read or write data of the base band processor 12 and the RF tuner 14 through an $I^2C$ bus 11, respectively. The $I^2C$ bus 11 also connects to the second slave interface 141 of the RF tuner 14 when the host controller 10 only read or write data of the base band processor 12 through the first slave interface 121 and the $I^2C$ bus 11. Therefore, the host controller 10 will interfere with the RF tuner 14 although the host controller 10 does not read or write data of the RF tuner 14, and the interference will influence normal operation of the RF tuner 14 to cause problems.

Referring to FIG. 2, FIG. 2 shows another RF tuner system applied with an $I^2C$. As shown in FIG. 2, a second master interface 222 is added in a base band processor 22. A host controller 20 can access data of an RF tuner 24 through a first slave interface 221 and the second master interface 222 of the base band processor 22. First, the first slave interface 221 of the base band processor 22 receives instructions sent from a first master interface 201 of the host controller 20 through a first $I^2C$ bus 21. Then, the second master interface 222 transforms the received instructions from the first slave interface 221, and transmits the instructions to a second slave interface 241 of the RF tuner 24 through a second $I^2C$ bus 23. Finally, the second slave interface 241 receives the transformed instructions from the second master interface 222 and executes data access operations corresponding to the transformed instructions. This method can avoid the noise generation problem of the RF tuner 24 caused by the RF tuner 24 receiving interference. However, the sending and transmitting of instructions and corresponding data must be transformed through the first slave interface 221 and the second master interface 222, therefore, consuming a lot of time and increasing data processing time.

According to above conventional methods of the $I^2C$ applied in an RF tuner, the invention provides a data storage system to solve the above problems existing in the above prior art.

BRIEF SUMMARY OF THE INVENTION

A data storage system is provided. An exemplary embodiment of a data storage system comprises a first storage module for storing a first data, a second storage module for storing a second data, a control module and a processing module. The control module generates a first control signal and a second control signal, and accesses the first data and the second data according to the first control signal and the second control signal. The processing module is coupled to the first storage module, the second storage module and the control module, and controls the first storage module and the second storage module to transmit the first data and the second data to the control module according to the first control signal and the second control signal respectively, wherein the processing module bypasses the second storage module when receiving the first control signal.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
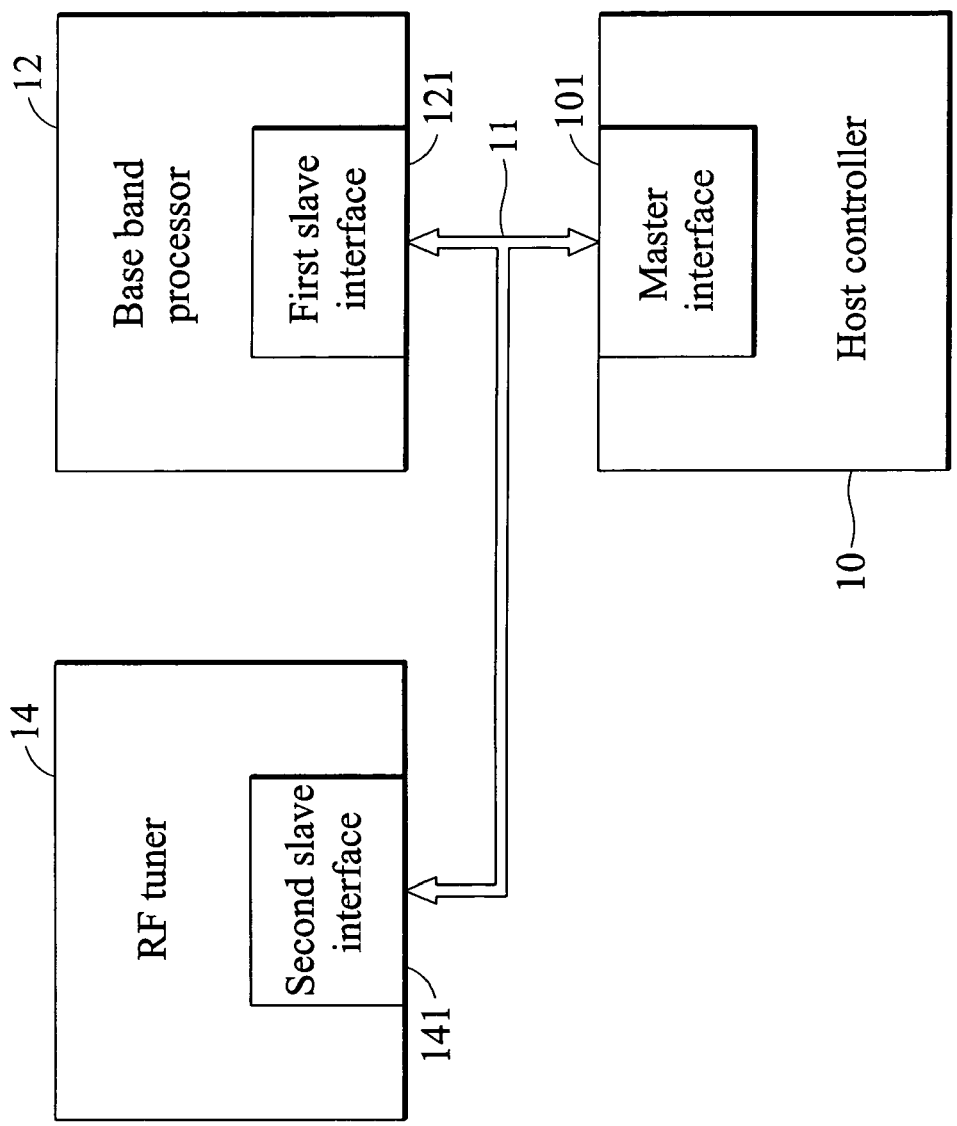
FIG. 1 shows an RF tuner system applied with an $I^2C$.
Figure 2:
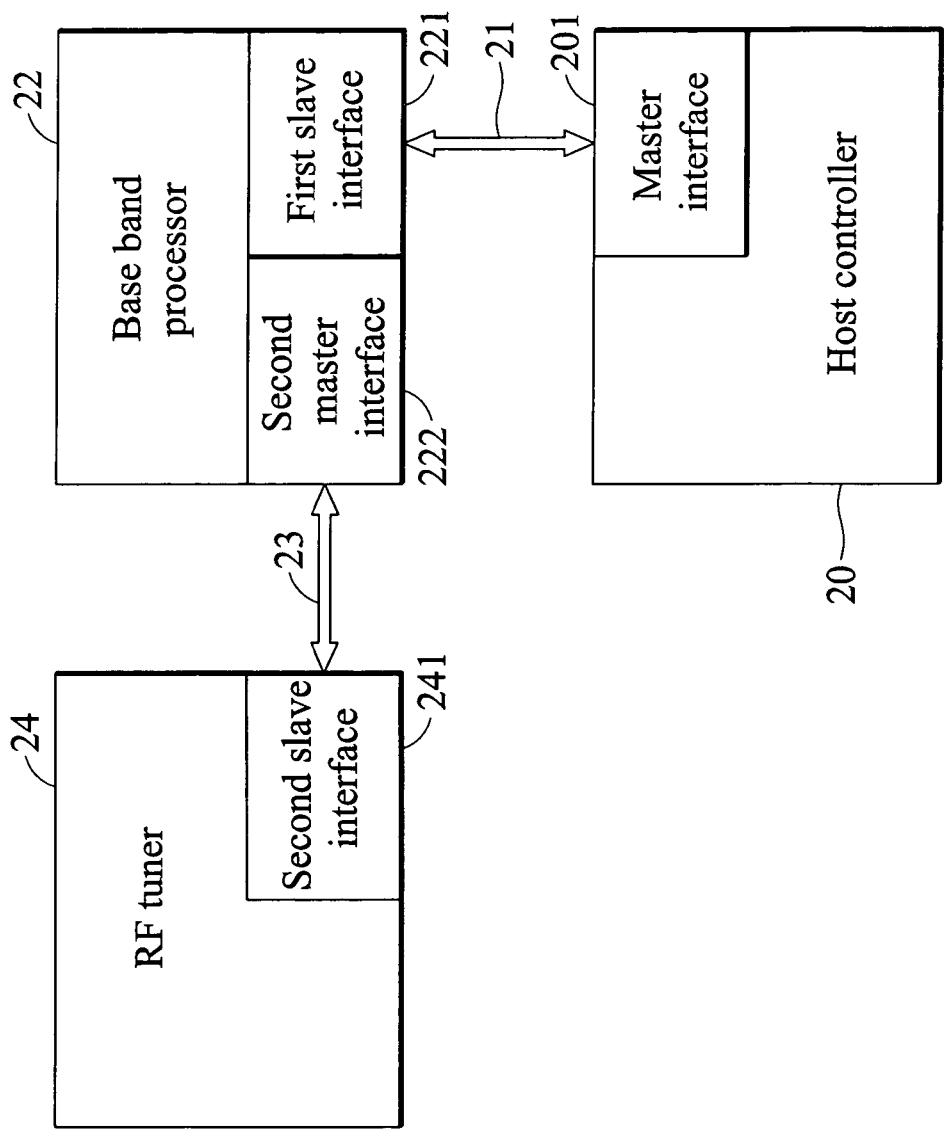
FIG. 2 shows another RF tuner system applied with an $I^2C$.
Figure 3:
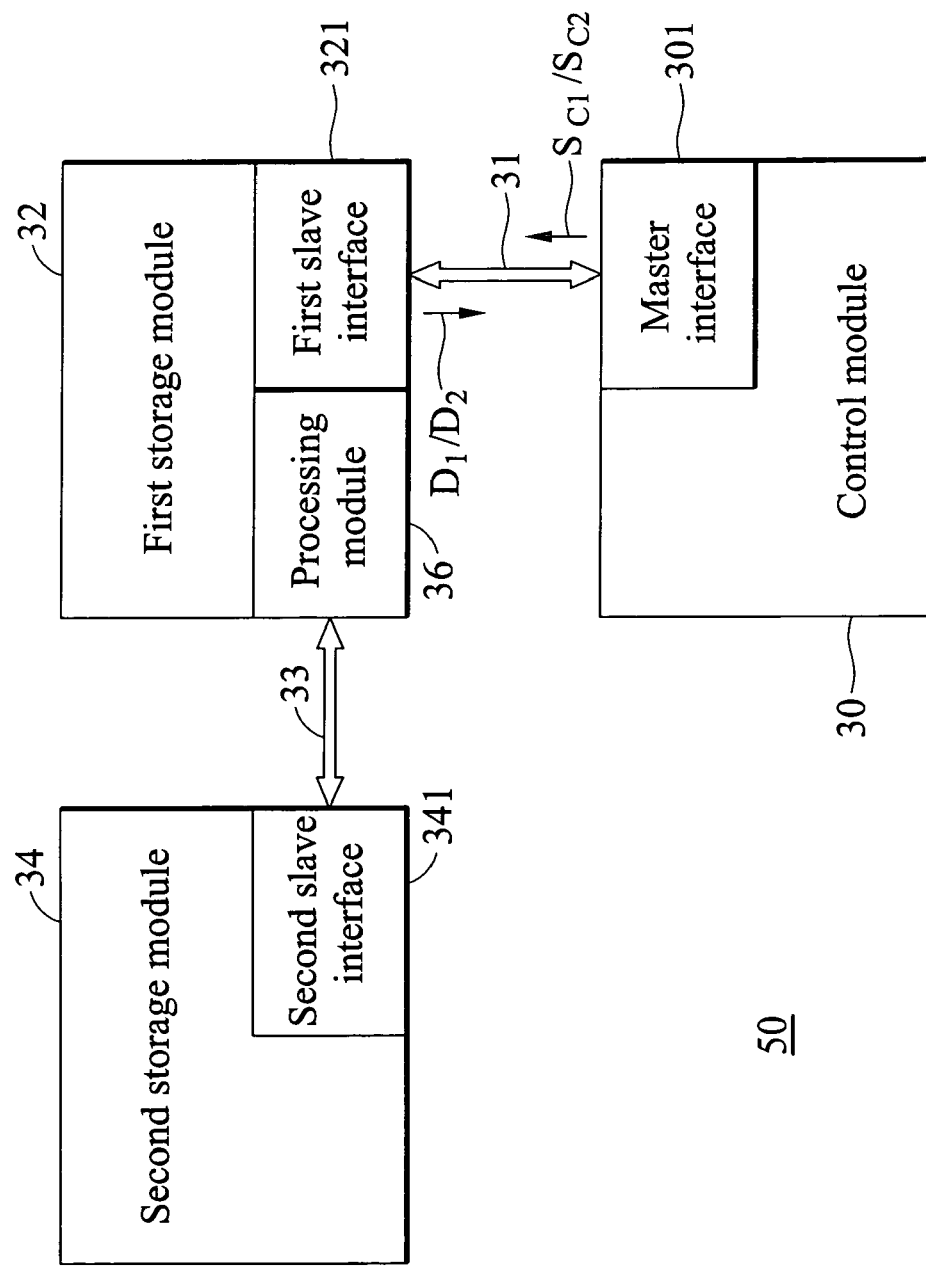
FIG. 3 shows a data storage system according to an embodiment of the invention.
Figure 4:
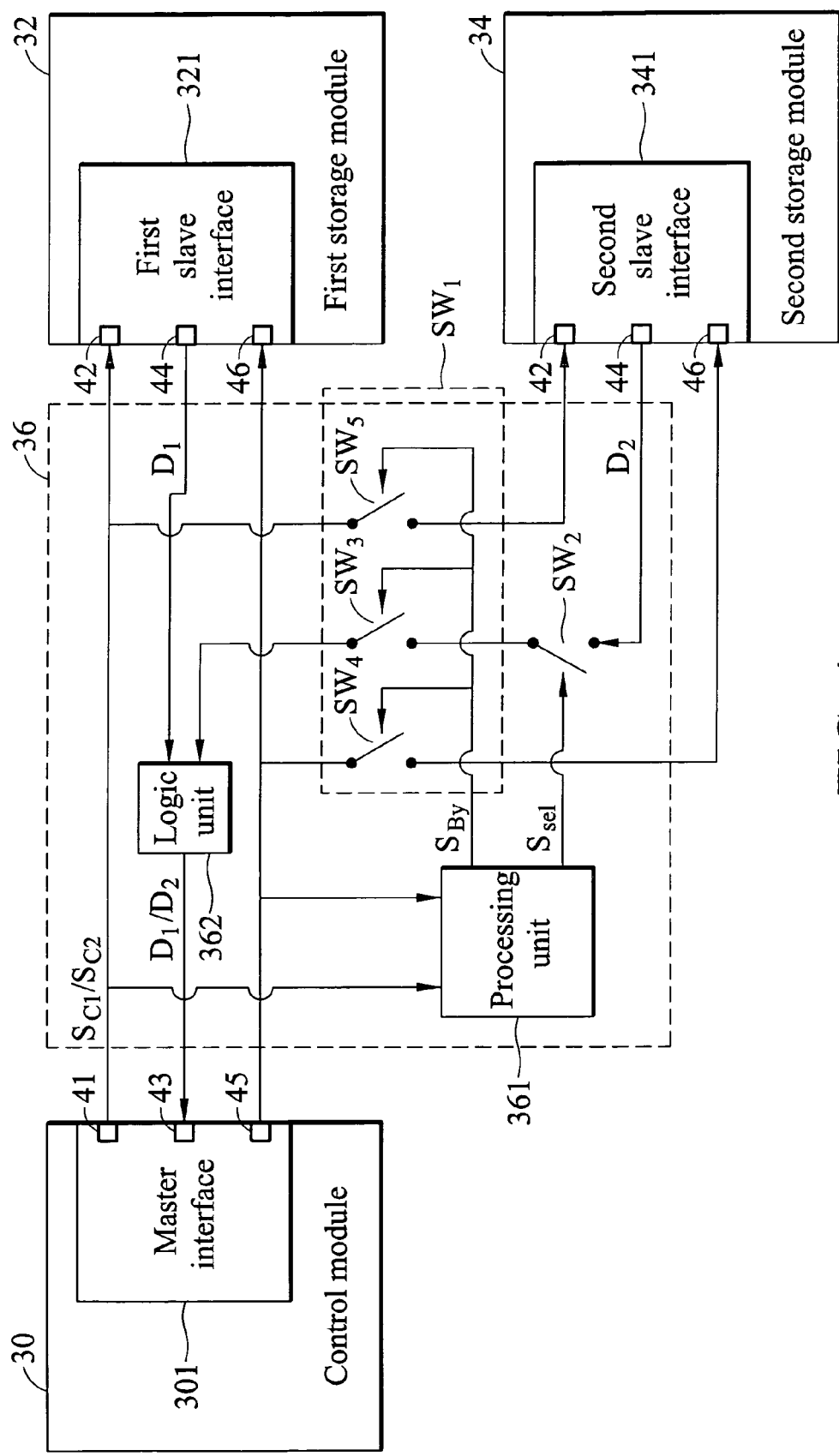
FIG. 4 shows a processing module of a data storage system according to an embodiment of the invention.

Referring to FIG. 3 and FIG. 4, FIG. 3 shows a data storage system according to an embodiment of the invention, and FIG. 4 shows a processing module of a data storage system according to an embodiment of the invention. As shown in FIG. 3 and FIG. 4, a data storage system 50 comprises a first storage module 32, a second storage module 34, a control module 30 and a processing module 36. The first storage module 32 stores a first data $D_1$, and the second storage module 34 stores a second data $D_2$. The control module 30 generates a first control signal $S_{C1}$ and a second control signal $S_{C2}$, and accesses the first data $D_1$ and the second data $D_2$ according to the first control signal $S_{C1}$ and the second control signal $S_{C2}$. The processing module 36 is coupled to the first storage module 32, the second storage module 34 and the control module 30. The processing module 36 controls the first storage module 32 and the second storage module 34 to transmit the first data $D_1$ and the second data $D_2$ to the control module 30 according to the first control signal $S_{C1}$ and the second control signal $S_{C2}$ respectively. If the processing module 36 receives the first control signal $S_{C1}$, the processing module 36 bypasses the second storage module 34 to avoid a problem that the second storage module 34 receives interference to generate noise due to the control module 30 accesses the first data $D_1$ to the first storage module 32.

In an embodiment, the first storage module 32 is a base band processing module, and the second storage module 34 is an RF tuner. The control module 30 comprises a master interface 301, wherein the master interface 301 transmits the first control signal $S_{C1}$ and the second control signal $S_{C2}$ generated from the control module 30. The first storage module 32 comprises a first slave interface 321, wherein the first slave interface 321 receives the first control signal $S_{C1}$ and accesses the first data $D_1$ according to the first control signal $S_{C1}$. The second storage module 34 comprises a second slave interface 341, wherein the second slave interface 341 receives the second control signal $S_{C2}$ and accesses the second data $D_2$ according to the second control signal $S_{C2}$.

In an embodiment, the master interface 301 is an I²C Master Interface, and the first slave interface 321 and the second slave interface 341 are I²C Slave Interface respectively. The master interface 301 comprises a data input terminal 43, a data output terminal 41 and a clock output terminal 45. Each of the master interface 301, the first slave interface 321 and the second slave interface 341 comprises a data input terminal 42, a data output terminal 44 and a clock input terminal 46 respectively.

The data storage system 50 further comprises a first bus 31 and a second bus 33. The first bus 31 is coupled between the master interface 301 and the first slave interface 321 for transmitting signals and data, and the second bus 33 is coupled between the processing module 36 and the second slave interface 341 for transmitting signals and data.

In FIG. 4, the processing module 36 comprises a processing unit 361 coupled to the control module 30, wherein the processing unit 361 generates a bypass signal $S_{By}$ according to the first control signal $S_{C1}$ and the second control signal $S_{C2}$. Furthermore, the processing module 36 also comprises a plurality of first switches $SW_1$ coupled between the first storage module 32, the second storage module 34 and the control module 30, wherein the first switches $SW_1$ are controlled to bypass the second storage module 34 according to the bypass signal $S_{By}$. In addition, the processing module 36 also comprises a second switch $SW_2$ coupled between a third switch $SW_3$ of the first switches $SW_1$ and the second storage module 34. The processing unit 361 generates a select signal $S_{sel}$, wherein the select signal $S_{sel}$ controls the second switch $SW_2$ to transmit the second data $D_2$ to the control module 30 when the second storage module 34 transmits the second data $D_2$ according to the second control signal $S_{C2}$.

In an embodiment, the first switches $SW_1$ are coupled between the data input terminal 42, the data output terminal 44 and clock input terminal 46 of the first storage module 32, the second storage module 34 and the control module 30. The second switch $SW_2$ is coupled between the third switch $SW_3$ of the first switches $SW_1$ and the data output terminal 44 of the second slave interface 341.

The first switches $SW_1$ further comprises a forth switch $SW_4$ and a fifth switch $SW_5$. The fourth switch $SW_4$ is coupled between the clock input terminal 46 of the first storage module 32, the clock input terminal 46 of the second storage module 34 and the clock output terminal 45 of the control module 30. The fifth switch $SW_5$ is coupled between the data input terminal 42 of the first storage module 32, the data input terminal 42 of the second storage module 34 and the data output terminal 41 of the control module 30.

The processing module 36 also comprises a determining unit (no shown) coupled to the control module 30, wherein the determining unit is used for determining whether a signal from the control module 30 is the first control signal $S_{C1}$ or the second control signal $S_{C2}$. The processing module 36 further comprises a logic unit 362 coupled to the first storage module 32, the second storage module 34 and the control module 30, wherein the logic unit 362 controls transmissions of the first data $D_1$ and the second data $D_2$. In an embodiment, the logic unit 362 is an XNOR gate.

As described above, the invention provides a data storage system. The processing module bypasses the second storage module when the control module only accesses data to the first storage module. The invention effectively solves the generated noise problem by the second storage module receiving interference, and does not require complex circuitry or extra costs.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A data storage system, comprising:
   a first storage module for storing a first data;
   a second storage module for storing a second data;
   a control module for generating a first control signal and a second control signal, and accessing the first data and the second data according to the first control signal and the second control signal; and
   a processing module separate from the control module for controlling the first storage module and the second storage module to transmit the first data and the second data to the control module according to the first control signal and the second control signal respectively,
   wherein the processing module bypasses the second storage module when receiving the first control signal.

2. The data storage system as claimed in claim 1, wherein the processing module comprises a processing unit coupled to the control module for generating a bypass signal according to the first and second control signals.

3. The data storage system as claimed in claim 2, wherein the processing module further comprises a plurality of first switches coupled between the first storage module, the second storage module and the control module, wherein the first switches are controlled to bypass the second storage module according to the bypass signal.

4. The data storage system as claimed in claim 3, wherein the processing module further comprises a second switch coupled between a third switch of the first switches and the second storage module, wherein the processing unit generates a select signal for controlling the second switch to transmit the second data to the control module when the second storage module transmits the second data according to the second control signal.

5. The data storage system as claimed in claim 4, wherein the control module comprises a master interface for transmitting the first and second control signals generated from the control module.

6. The data storage system as claimed in claim 5, wherein the first storage module comprises a first slave interface for receiving the first control signal and accessing the first data according to the first control signal, and the second storage module comprises a second slave interface for receiving the second control signal and accessing the second data according to the second control signal.

7. The data storage system as claimed in claim 6, wherein the master interface is an I.sup.2C Master Interface, and the first slave interface and the second slave interface are I.sup.2C Slave Interface respectively.

8. The data storage system as claimed in claim 6, further comprising a first bus and a second bus, wherein the first bus is coupled between the master interface and the first slave interface for transmitting signals and data, and the second bus is coupled between the processing module and the second slave interface for transmitting signals and data.

9. The data storage system as claimed in claim 8, wherein each of the master interface, the first slave interface and the second slave interface comprises a data input terminal, a data output terminal and a clock input terminal.

10. The data storage system as claimed in claim 9, wherein the first switches are coupled between the data input, data output and clock input terminals of the first storage module, the second storage module and the control module.

11. The data storage system as claimed in claim 9, wherein the second switch is coupled between the processing module and the data output terminal of the second slave interface.

12. The data storage system as claimed in claim 1, wherein the processing module comprises a determining unit coupled to the control module for determining whether a signal from the control module is the first control signal or the second control signal.

13. The data storage system as claimed in claim 1, wherein the processing module comprises a logic unit coupled to the first storage module, the second storage module and the control module for controlling transmissions of the first data and the second data.

14. The data storage system as claimed in claim 13, wherein the logic unit is an XNOR gate.

15. The data storage system as claimed in claim 1, wherein the first storage module is a base band processing module.

16. The data storage system as claimed in claim 1, wherein the second storage module is an RF tuner.

* * * * *